United States Patent
Agrawal et al.

(10) Patent No.: US 9,426,285 B2
(45) Date of Patent: Aug. 23, 2016

(54) METHOD AND ELECTRONIC DEVICE FOR INDIVIDUALIZING RINGTONES

(71) Applicant: Google Technology Holdings LLC, Mountain View, CA (US)

(72) Inventors: Amit Kumar Agrawal, Bangalore (IN); Satyabrata Rout, Bhubaneswar (IN)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/448,268

(22) Filed: Jul. 31, 2014

(65) Prior Publication Data
US 2016/0036967 A1 Feb. 4, 2016

(51) Int. Cl.
| | | |
|---|---|---|
| H04M 3/42 | (2006.01) | |
| H04W 4/16 | (2009.01) | |
| H04W 4/02 | (2009.01) | |
| H04W 4/18 | (2009.01) | |
| H04W 4/12 | (2009.01) | |
| H04M 19/04 | (2006.01) | |
| H04M 1/725 | (2006.01) | |

(52) U.S. Cl.
CPC ....... H04M 3/42051 (2013.01); H04M 19/041 (2013.01); H04W 4/023 (2013.01); H04W 4/12 (2013.01); H04W 4/16 (2013.01); H04W 4/18 (2013.01); H04M 1/72572 (2013.01)

(58) Field of Classification Search
None
See application file for complete search history.

(56) References Cited

U.S. PATENT DOCUMENTS

| 7,078,607 B2 | 7/2006 | Alferness |
| 7,602,901 B1 | 10/2009 | Kates et al. |
| 7,732,697 B1 | 6/2010 | Wieder |
| 8,027,460 B1 | 9/2011 | Coughlan et al. |
| 2005/0107128 A1 | 5/2005 | Deeds |
| 2006/0040647 A1* | 2/2006 | Moody ............. H04M 1/72547 455/412.2 |
| 2009/0325630 A1* | 12/2009 | Tiitola ................ G06F 9/44505 455/550.1 |
| 2013/0331127 A1* | 12/2013 | Sabatelli ............... H04W 4/021 455/456.3 |
| 2014/0194101 A1 | 7/2014 | Mullen et al. |
| 2014/0194104 A1* | 7/2014 | Mullen et al. ................. 455/418 |
| 2015/0079949 A1* | 3/2015 | Vishwanath ............ H04M 3/02 455/414.1 |
| 2015/0156614 A1* | 6/2015 | Chi ...................... H04M 19/044 455/414.1 |
| 2015/0195692 A1* | 7/2015 | Chow ................... H04M 19/04 455/414.1 |
| 2015/0371210 A1* | 12/2015 | Chatterjee ............ G06Q 20/327 705/21 |

FOREIGN PATENT DOCUMENTS

JP 2011077755 A 4/2011

OTHER PUBLICATIONS

International Search Report and Written Opinion of International Application No. PCT/US2015/043008, mailed Oct. 20, 2015, 14 pp.

* cited by examiner

*Primary Examiner* — Hilina K Demeter
(74) *Attorney, Agent, or Firm* — Shumaker & Sieffert, P.A.

(57) ABSTRACT

A first electronic device ("first device") identifies a second electronic device ("second device") that is within hearing range of the first device. The first device determines whether a ringtone of the first device conflicts with a ringtone of the second device (e.g., the first and second devices have the same incoming text message ringtone). If the first device determines that there is a conflict (e.g., the active ringtones of the two devices have the same file name or the audio files of the ringtones have the same digital signature or identifier) then the first device appends an individualized alert to its ringtone, either in advance of playing the ringtone or in real time as the ringtone is being played.

18 Claims, 4 Drawing Sheets

METHOD AND ELECTRONIC DEVICE FOR INDIVIDUALIZING RINGTONES

TECHNICAL FIELD

The present disclosure is related generally to wireless communication devices and, more particularly, to a method and electronic device for individualizing ringtones.

BACKGROUND

Mobile ringtones and alerts have evolved from simple alert mechanisms to individual fashion statements. Indeed, it is very common to find snippets of television shows and popular music hits being used. Although the more trendy ringtones and alerts tend to be ones that users need to download separately, mobile devices often come preloaded with dozens of them. In spite of this available variety, many users simply do not take the time to customize their devices. As a result, it is not uncommon for multiple users in any given situation to have the exact same ringtone and the exact same alert. This leads to the often-repeated scene where the default alert sounds on one person's phone and everyone in the group checks their devices for an incoming text.

DRAWINGS

Figure 1:
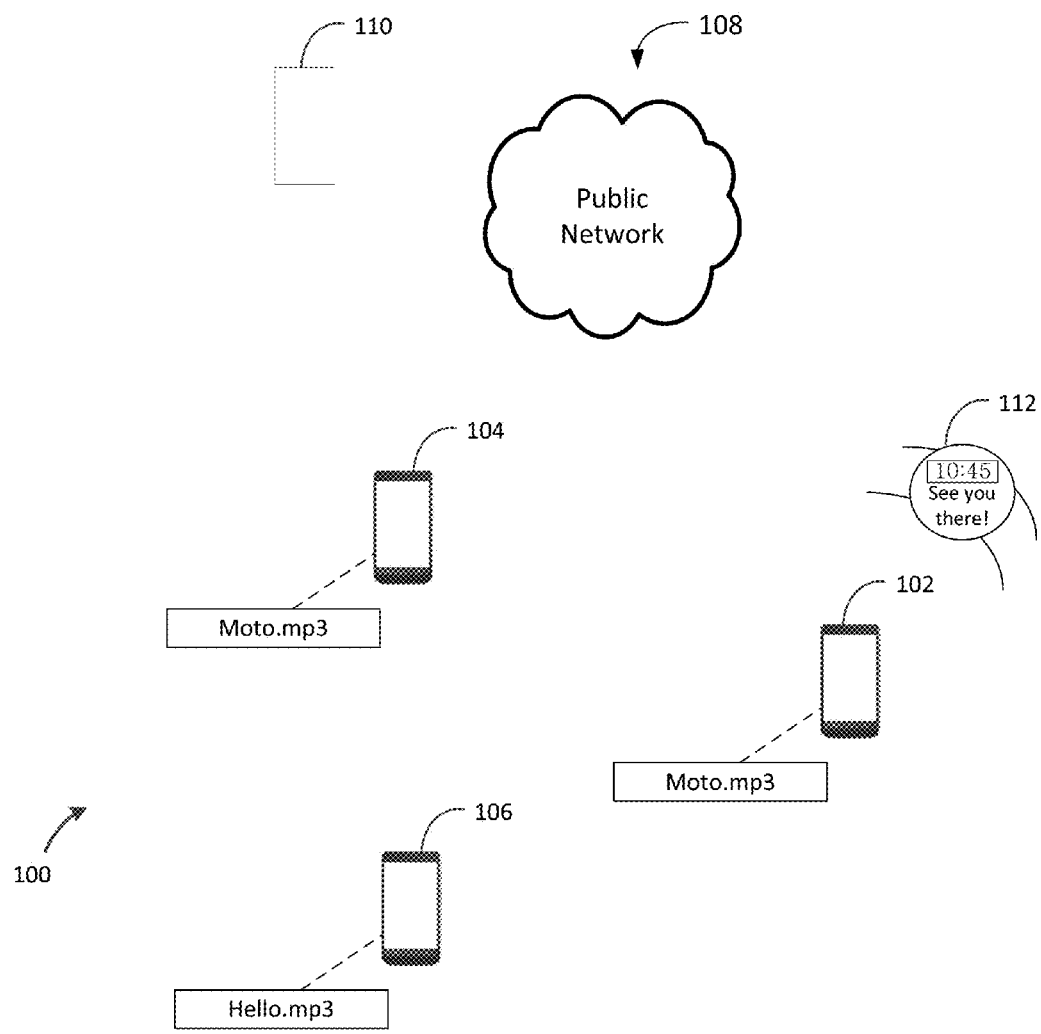
Figure 2:
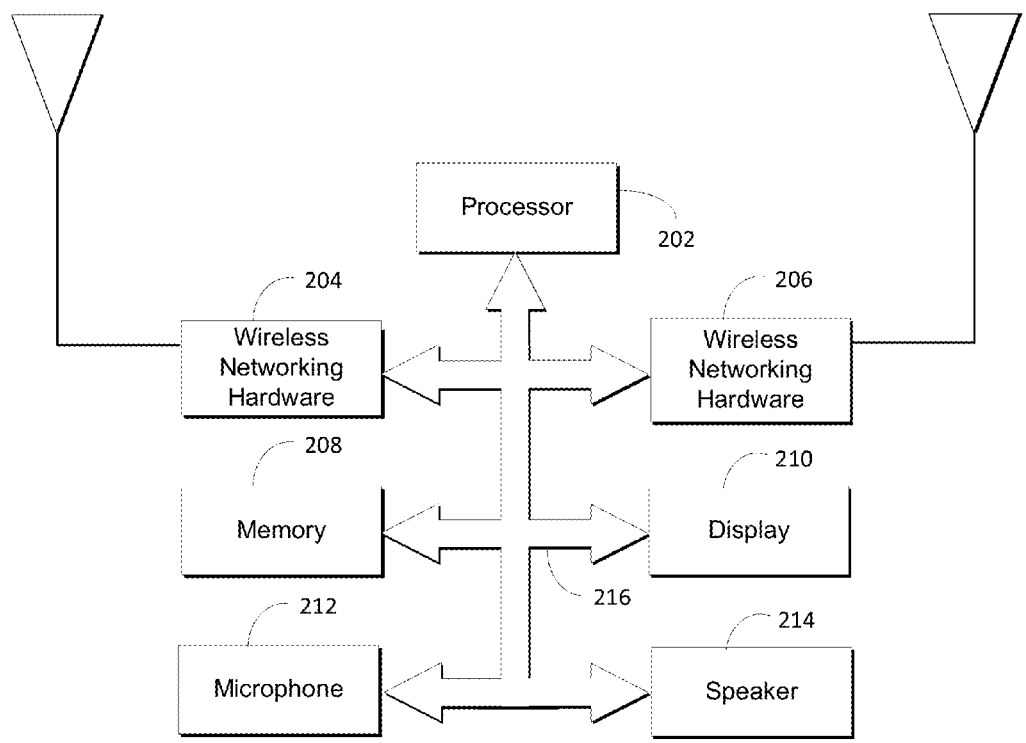
Figure 3:
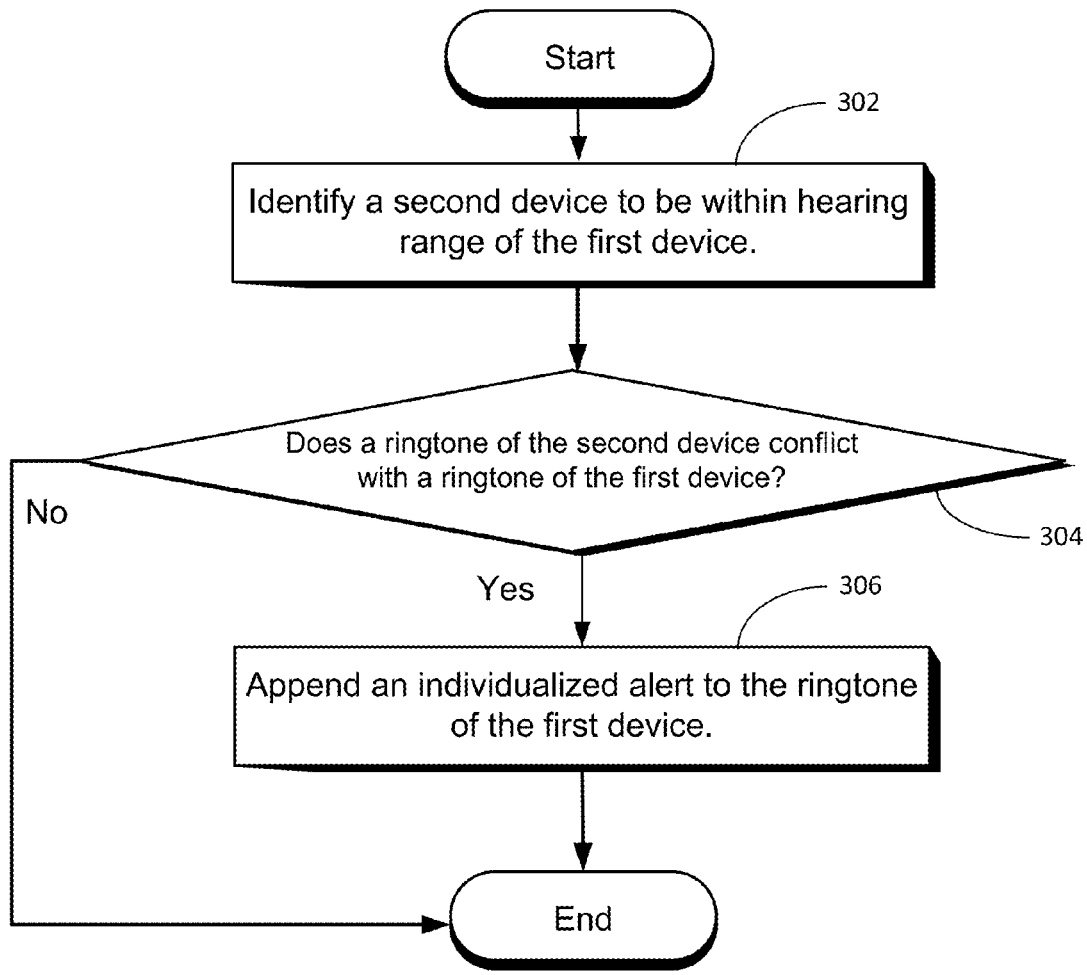
Figure 4:
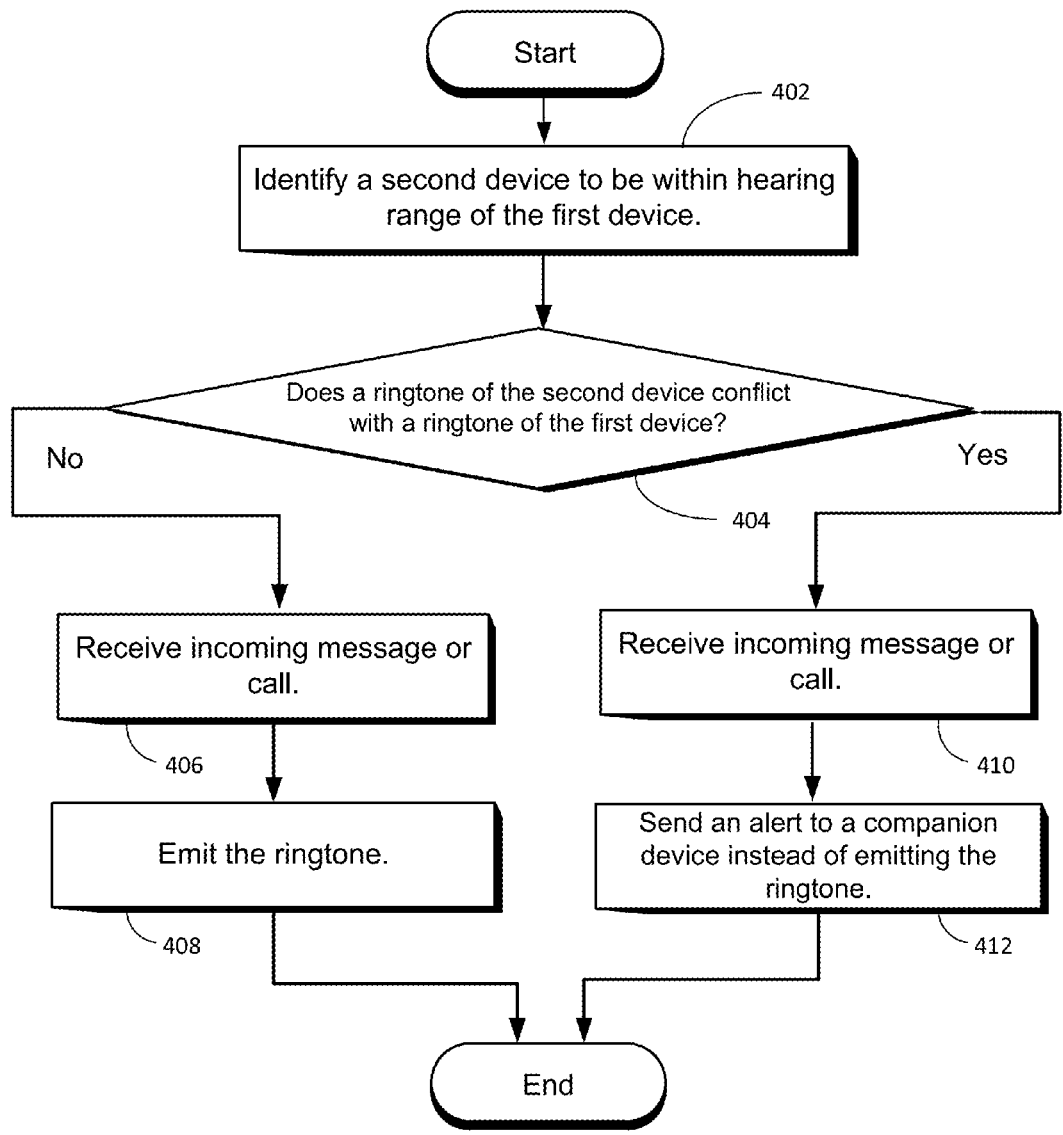

While the appended claims set forth the features of the present techniques with particularity, these techniques, together with their objects and advantages, may be best understood from the following detailed description taken in conjunction with the accompanying drawings of which:

FIG. 1 block diagram of a group of wireless communication devices that are within hearing range of one another in an embodiment;

FIG. 2 is a block diagram depicting components of an electronic device according to an embodiment; and FIGS. 3 and 4 show process flow diagrams that illustrate the operation of different embodiments.

DESCRIPTION

As used herein, the term "ringtone" includes all types of audible alerts and notifications, including incoming call alerts (the traditional "ringtone"), incoming message alerts, social media alerts, device status notifications, etc. The term "ringtone" also applies to alerts and notifications that are spoken (e.g., "Incoming call from John Smith," "Voicemail from John Smith," or "Low Battery").

This disclosure is generally directed to a method for individualizing ringtones on an electronic device ("device"). According to various embodiments, a first electronic device ("first device") identifies a second electronic device ("second device") that is within hearing range of the first device. The first device identifies the second device (i.e., comes to the conclusion that the second device is within hearing range) based on one or more of the following factors: (1) the distance between the first device and the second device (e.g., the distance is less than a threshold value), (2) the strength of a signal transmitted to or received from the second device (e.g., via WiFi or Bluetooth®), (3) the volume of the speaker of either or both the first and second device (e.g., the ringtone volume setting), and (4) the ambient noise. The first device determines whether a ringtone of the first device conflicts with a ringtone of the second device (e.g., the first and second devices have the same incoming text message ringtone or both devices are set to the same default ringtone). If the first device determines that there is a conflict (e.g., the active ringtones of the two devices have the same file name or the audio files of the ringtones have the same digital signature or identifier) then the first device appends an individualized alert to its ringtone, either in advance of playing the ringtone or in real time as the ringtone is being played. In some embodiments, the individualized alert is in the form of text that the first device plays as synthesized speech. For example, the text could be the user's name along with a message, such as "Incoming text for John." The message could be played before, during, or after the first device plays the ringtone.

Turning to FIG. 1, a group 100 of wireless communication devices includes a first device 102, a second device 104, and a third device 106. Possible implementations for each of the devices include a cell phone (such as a smart phone), a tablet computer, and a notebook computer. All of the wireless communication devices in the group 100 are within hearing range of one another. That is, they are close enough to one another that their respective ringtones can be heard by all of the users. For example, if the first device 102 emits an incoming message alert, the user of the second device 104 and the user of the third device 106 (assuming they have normal hearing) will be able to hear the alert from the first device 102. One or more of the devices of FIG. 1 may be paired with a companion device. For example, the first device 102 is shown as being paired with a smart watch 112.

The devices 102, 104, and 106 are capable of communicating over a public network 108 (e.g., a cellular network or a WiFi network) with other devices, such as a remote server 110. In some embodiments all of the devices 102, 104, and 106 are capable of communicating directly with one another, such as by forming an ad hoc peer-to-peer network.

Turning to FIG. 2, each of the devices in FIG. 1, according to an embodiment, includes a processor 202. Several components are communicatively linked to the processor 202, including first wireless networking hardware 204 (e.g., a cellular baseband chipset), second wireless networking hardware 206 (e.g., a WiFi or Bluetooth® chipset), a memory 208, a display 210 (e.g., an organic, light-emitting diode display), a microphone 212, and a speaker 214. The processor 202 sends data to and receives data from other devices using the first wireless networking hardware 204 or the second wireless networking hardware 206. The elements of FIG. 2 are communicatively linked to one another via one or more data pathways 216. Possible implementations of the data pathways 216 include wires and conductive pathways on a microchip. Possible implementations of the processor 202 include a microprocessor and a controller. The memory 208 may be volatile, non-volatile, or a combination thereof.

The processor 202 retrieves instructions from the memory 208 and operates according to those instructions to carry out various functions, including the methods described herein. Thus, when this disclosure refers to a device carrying out an action, it is, in many embodiments, the processor 202 that actually carries out the action (in coordination with other pieces of hardware of the device as necessary).

According to an embodiment, the first device 102 stores one or more properties associated with a user (e.g., the owner) of the first device 102. These one or more properties help to differentiate the user from users of other devices (e.g., the owners of the other devices of FIG. 1). Examples of differentiating properties include the user's name or the user-assigned name of the first device 102.

Turning to FIG. 3, a process carried out by the first device 102 according to an embodiment is described. At block 302, the first device 102 identifies a second device as being within hearing range of the first device 102. As noted above, possible ways the first device 102 can identify (or attempt to identify) the other devices as being within hearing range include distance (as determined, for example, using the global positioning system coordinates reported by the other devices to the first device), speaker volume, ambient noise, and signal strength. For the sake of example, assume that the first device 102 joins an ad hoc peer-to-peer network that includes the second device 104 and the third device 106. Further assume that first device 102 determines that the second device 104 and the third device 106 are both within hearing range of the first device 102 for the following reasons: (1) The first device 102 senses the ambient noise with the microphone 212 and determines that the environment is quiet. (2) The first device 102 is a single hop from the second device 104 and the third device 106. (3) The ringtone volume of the speaker 214 of the first device 102 is at its maximum.

At block 304, the first device 102 determines whether a ringtone of a second device 104 (i.e., either the second device 104 or the third device 106) conflicts with a ringtone of the first device 102. There are many ways in which the first device 102 may make this determination. In one embodiment, the first device 102 obtains data regarding the active (i.e., those being currently used) ringtones for the second device 104 and third device 106. The first device 102 may, for example: (1) directly request the names of the active ringtones (i.e., the incoming call ringtones and the alert ringtones) from the second device 104 and the third device 106, (2) browse the active ringtone files of the second device 104 and the third device 106 via peer-to-peer networking (assuming that the second and third devices have shared those files), or (3) contact the remote server 110 (assuming that the remote server 110 centrally manages the ringtones for the devices) to request the data. The data can be in the form of, for example, file metadata (e.g., filename or .mp3 metadata) or a digital signature. Once the first device 102 obtains the data regarding the active ringtones of the other devices, the first device 102 compares the data with the equivalent data of its own ringtones.

In the example of FIG. 1, the first device 102 has a messaging alert ringtone with the filename "Moto.mp3," the second device 104 has a messaging alert ringtone with the filename "Moto.mp3," and the third device 106 has a messaging alert ringtone with the filename "Hello.mp3." The first device 102 will conclude that there is a conflict based on the fact that the ringtone of second device 104 has the same filename as the ringtone of the first device 102. The first device 102 may also be able to tell if the ringtones are similar enough, even if not identical, to possibly cause confusion based, for example, on the file metadata or on a digital signature of each of the ringtone files. If the first device 102 concludes that there is no conflict, the process ends.

If the first device 102 concludes that there is a conflict, then the process continues to block 306, at which the first device 102 appends an individualized alert to the ringtone of the first device. Examples of how this may be done include the following.

In one implementation, the first device 102 takes an item of information that differentiates the user of the first device 102, such as the user's name or the device name (e.g., set by the user when the user originally set up the first device 102) and produces synthesized speech (so-called "text-to-speech"). The first device 102 appends the synthesized speech to the ringtone, such as by emitting the synthesized speech immediately prior to, interspersed with, overlapping with, or immediately after emitting the ringtone (e.g., when the first device 102 receives an incoming text). In some embodiments, the first device 102 selects a secondary piece of textual data if the first piece of textual data is a duplicate of that of one of the other devices. For example, assume that the first device's default choice for an individualized identifier is the user's first name, the user name on the first device 102 is "John Smith," and the user name on the second device 104 is "John Connelly." The first device 102 would learn this fact during communication with the second device 104 (e.g., when determining which ringtones the second device 104 has) and would switch to the last name as the individualized identifier.

In another implementation, the first device 102 takes a previously-recorded individualized alert—either an additional ringtone or a voice recording (e.g., of the user's voice)—and appends the individualized alert to the ringtone (e.g., in one of the ways described above). For example, the user of the first device 102 could record her voice saying "Alice you have received a message." Then, when the first device 102 receives an incoming text message, it may play the user's voice and then play the ringtone. By doing this, the first device 102 will help to avoid confusion regarding who received the alert (i.e., confusing between the user of the first device 102 and the user of the second device 104).

Turning to FIG. 4, a process carried out by the first device 102 according to another embodiment is described. The first device 102 carries out blocks 402 and 404 in the same manner described above with respect to blocks 302 and 304 in FIG. 3. If, at block 404, the first device 102 concludes that there is no conflict and (at block 406), the first device 102 receives an incoming call or message, the first device 102 will emit the preconfigured, preset, or default ringtone (for an incoming call or message) from the speaker 214 at block 408. If, at block 404, the first device 102 concludes that there is a conflict and (at block 410) the first device 102 receives an incoming call or message, then the first device 102 will send an alert to the companion device 112 instead of emitting the ringtone. By doing this, the first device 102 will help to make it clear to the user of the first device 102 that the alert belongs to him or her, and not to the user of the second device 104.

According to an embodiment, the first device 102 monitors whether devices with conflicting ringtones (of the devices identified as being within hearing range) continue to remain within hearing range. In other words, the first device 102 can detect when, for example, one or more of the distance (from the second device 104), the speaker volume (of the first device 102), the ambient noise, and the signal strength (between the first device 102 and the second device 104 of FIG. 1) changes to an extent that the first device 102 no longer considers the second device 104 to be within hearing range. For example, if the first device 102 no longer detects any signal from the second device 104 in the ad hoc, peer-to-peer network, then the second device 102 may stop appending the individualized alert to the ringtone and revert back to "regular" ringtone handling.

In view of the many possible embodiments to which the principles of the present discussion may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

We claim:

1. A method comprising:
    identifying, by a first electronic device, a second electronic device to be within hearing range of the first electronic device, wherein identifying the second electronic device to be within hearing range of first electronic device comprises:
        determining a speaker volume of at least one of the first electronic device or the second electronic device;
        determining a strength of a signal passed between the first electronic device and the second electronic device; and
        identifying the second electronic device based on the determined speaker volume and the determined signal strength;
    determining whether a ringtone of the second electronic device conflicts with a ringtone of the first electronic device;
    responsive to determining that the ringtone of the second electronic device conflicts with the ringtone of the first electronic device, selecting, by the first electronic device, an individualized ringtone comprising an individualized alert, and appending the individualized alert to at least the ringtone of the first electronic device; and
    responsive to receiving a call while the first electronic device is within hearing range of the second electronic device, outputting, by the first electronic device, the individualized ringtone.

2. The method of claim 1, wherein identifying the second electronic device to be within hearing range of the first electronic device comprises determining that the second electronic device is within a predetermined distance of the first electronic device.

3. The method of claim 1, wherein identifying the second electronic device to be within hearing range of first electronic device further comprises:
    determining a speaker volume of at least one of the first and second electronic devices;
    determining a distance between the first electronic device and the second electronic device; and
    identifying the second electronic device further based on determined speaker volume and on the determined distance.

4. The method of claim 1, wherein appending the individualized alert comprises appending the individualized alert at a beginning of the ringtone of the first electronic device, inserting the individualized alert within the ringtone of the first electronic device, or appending the individualized alert to an end of the ringtone of the first electronic device.

5. The method of claim 4, wherein appending the individualized alert to the ringtone of the first electronic device comprises converting text that individually identifies a user of the first electronic device into speech and emitting the speech from a speaker of the first electronic device along with the ringtone of the first electronic device.

6. The method of claim 1, further comprising:
    determining that a first item of identifying information of the first electronic device is the same as that of the second electronic device;
    determining that a second item of identifying information of the first electronic device is different from that of the second electronic device; and
    basing the individualized alert on the second item of identifying information.

7. The method of claim 1, wherein determining whether the ringtone on the second electronic device conflicts with the ringtone of the first electronic device comprises:
    establishing a communication link with the second electronic device; and
    querying the second electronic device regarding active ringtones of the second electronic device.

8. The method of claim 1, wherein determining whether the ringtone on the second electronic device conflicts with the ringtone of the first electronic device comprises:
    establishing a communication link with a server via a public network; and
    querying the server regarding active ringtones of the second electronic device.

9. The method of claim 1, further comprising:
    responsive to determining that the first electronic device is no longer within hearing range of the second electronic device, ceasing to append the individualized alert to the ringtone.

10. The method of claim 1, wherein the ringtone individualized on the first electronic device is selected from a group consisting of an incoming call ringtone, an incoming message alert, a device status notification, a social media alert, and a spoken notification.

11. The method of claim 1, wherein determining whether the ringtone of the second electronic device conflicts with the ringtone of the first electronic device comprises determining whether the second electronic device is set to a default ringtone.

12. A method comprising:
    identifying, by a first electronic device, a second electronic device to be within hearing range of the first electronic device, wherein identifying the second electronic device to be within hearing range of first electronic device comprises:
        determining a speaker volume of at least one of the first electronic device or the second electronic device;
        determining a strength of a signal passed between the first electronic device and the second electronic device; and
        identifying the second electronic device to be within hearing range based on the determined speaker volume and on the determined signal strength;
    determining, by the first electronic device, whether a ringtone of the second electronic device conflicts with a ringtone of the first electronic device;
    receiving an incoming call or a message on the first electronic device;
    responsive to determining that the ringtone of the second electronic device does not conflict with a ringtone of the first electronic device, emitting, by the first electronic device, the ringtone; and
    responsive to determining that the ringtone of the second electronic device conflicts with the ringtone of the first electronic device, sending, by the first electronic device and to a companion device that is paired to the first electronic device, an alert instead of emitting the ringtone.

13. The method of claim 12, wherein identifying the second electronic device to be within hearing range of the first electronic device comprises determining that the second electronic device is within a predetermined distance of the first electronic device.

14. The method of claim 12, wherein identifying the second electronic device to be within hearing range of first electronic device further comprises:
    determining a speaker volume of at least one of the first and second electronic devices;
    determining a distance between the first electronic device and the second electronic device; and identifying the second electronic device further based on determined speaker volume and on the determined distance.

15. The method of claim 12, wherein determining whether the ringtone on the second electronic device conflicts with the ringtone of the first electronic device comprises:
   establishing a communication link with the second electronic device; and
   querying the second electronic device regarding active ringtones of the second electronic device.

16. The method of claim 12, wherein determining whether the ringtone on the second electronic device conflicts with the ringtone of the first electronic device comprises:
   establishing a communication link with a server via a public network; and
   querying the server regarding active ringtones of the second electronic device.

17. The method of claim 12, further comprising:
   responsive to determining that the first electronic device is no longer within hearing range of the second electronic device,
   ceasing to append the individualized alert to the ringtone.

18. A first electronic device comprising:
   a speaker;
   a processor configured to:
      identify a second electronic device to be within hearing range of the first electronic device, wherein the processor configured to identify the second electronic device to be within hearing range of first electronic device comprises the processor being configured to:
         determine a speaker volume of at least one of the first electronic device or the second electronic device;
         determine a strength of a signal passed between the first electronic device and the second electronic device; and
         identify the second electronic device to be within hearing range based on the determined speaker volume and on the determined signal strength;
      determine whether a ringtone of the second electronic device conflicts with a ringtone of the first electronic device;
      responsive to determining determines the ringtone of the second electronic device conflicts with the ringtone of the first electronic device, select an individualized ringtone comprising an individualized alert, and appending the individualized alert to at least the ringtone of the first electronic device; and
      responsive to receiving a call while the first electronic device is within a hearing range of the second electronic device, output the individualized ringtone to the user.

* * * * *